(12) United States Patent
Xu et al.

(10) Patent No.: US 8,934,431 B2
(45) Date of Patent: Jan. 13, 2015

(54) METHOD DEVICE AND SYSTEM FOR INDICATING USER EQUIPMENT-SPECIFIC DEMODULATION REFERENCE SIGNAL

(75) Inventors: Xiaodong Xu, Beijing (CN); Hai Tang, Beijing (CN); Qixing Wang, Beijing (CN); Zhihua Shi, Beijing (CN); Jianjun Liu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 246 days.

(21) Appl. No.: 13/577,047

(22) PCT Filed: Jan. 31, 2011

(86) PCT No.: PCT/CN2011/000188
§ 371 (c)(1),
(2), (4) Date: Aug. 3, 2012

(87) PCT Pub. No.: WO2011/095062
PCT Pub. Date: Aug. 11, 2011

(65) Prior Publication Data
US 2012/0307768 A1 Dec. 6, 2012

(30) Foreign Application Priority Data
Feb. 5, 2010 (CN) .......................... 2010 1 0107276

(51) Int. Cl.
*H04B 7/02* (2006.01)
*H04B 7/04* (2006.01)
*H04L 27/26* (2006.01)
*H04L 5/00* (2006.01)

(52) U.S. Cl.
CPC ............ *H04L 5/0051* (2013.01); *H04L 5/0023* (2013.01)
USPC ........... 370/329; 370/203; 370/310; 370/328; 455/450

(58) Field of Classification Search
USPC .......... 370/203, 310, 322, 328–330; 455/450, 455/452.1, 453–455
See application file for complete search history.

(56) References Cited

U.S. PATENT DOCUMENTS

| | | | |
|---|---|---|---|
| 2009/0225737 A1* | 9/2009 | Kim et al. ...................... | 370/342 |
| 2010/0232384 A1* | 9/2010 | Farajidana et al. ........... | 370/329 |
| 2010/0303034 A1* | 12/2010 | Chen et al. ..................... | 370/329 |
| 2011/0103324 A1* | 5/2011 | Nam et al. ..................... | 370/329 |
| 2011/0237283 A1* | 9/2011 | Shan et al. ..................... | 455/509 |
| 2012/0134338 A1* | 5/2012 | Ko et al. ........................ | 370/330 |

FOREIGN PATENT DOCUMENTS

CN 101365232 A 2/2009

OTHER PUBLICATIONS

3GPP TSG RAN WG1 meeting #58—R1093030—DMRS design considerations for LTE-A.*

(Continued)

*Primary Examiner* — Andrew Chriss
*Assistant Examiner* — John LeQuang
(74) *Attorney, Agent, or Firm* — Workman Nydegger (57) ABSTRACT

A method, a device and a system for indicating terminal specific Demodulation Reference Signal (DMRS) are provided by the invention. The method includes that: a network side creates signal indicating information, and sends the created signal indicating information to a terminal (S501); the terminal, according to Transmission Block (TB) indicating information of the TB and multiple bits control information which are included in the signal indicating information, confirms DMRS pattern information, antenna port information and a scrambling ID of a reference signal sequence (S502) allocated for itself. The method, the device and the system provide by the invention, compared to the prior art, reduce signaling overhead which indicates the terminal specific DMRS, thus reducing resources waste of the system.

8 Claims, 5 Drawing Sheets

(56) References Cited

OTHER PUBLICATIONS

3GPP TSG RAN WG1 Metting #59—R1-094507—joint consideratin of DL DM-RS design and codeword-layer mapping for rank over 3.*

3GPP TSG RAN WG1 #59bis—R1-100112—Discussion on Layer to DMRS mapping.*

Huawei, DCI Format Designed for Dual-Layer Beamforming, 3GPP TSG RAN WG1 meeting #58bis, Oct. 12-16, 2009, Miyazaki, Japan.

International Search Report for PCT/CN2011/000188, mailed Apr. 28, 2011, 4 pages.

* cited by examiner

METHOD DEVICE AND SYSTEM FOR INDICATING USER EQUIPMENT-SPECIFIC DEMODULATION REFERENCE SIGNAL

RELATED APPLICATIONS

The present application is a U.S. National Stage of International Application No. PCT/CN2011/000188, filed 31 Jan. 2011, designating the United States, and claiming priority to Chinese Patent Application No. 201010107276.1 filed 5 Feb. 2010, the contents of which are herein incorporated by reference in their entirety

FIELD OF THE INVENTION

The present invention relates to the field of radio communication and particularly to a method, device and system for indicating an MIMO (Multiple-Input Multiple-Output)-based user equipment-specific demodulation reference signal.

BACKGROUND OF THE INVENTION

In a Long Term Evolution-A (LTE-A) system, MIMO transmission of up to the Rank of 8 is supported, and at present the MIMO transmission scheme is implemented based upon a user equipment-specific demodulation reference signal, where indication information is transmitted together with data from the network side to a user equipment over a physical downlink control channel to indicate a user equipment-specific demodulation reference signal allocated for the user equipment, and the user equipment performs channel estimation on a corresponding antenna port allocated for the user equipment according to the indicated user equipment-specific demodulation reference signal so as to receive the transmitted data. Particularly the user equipment-specific demodulation reference signal to be used for the user equipment is indicated by indicating a demodulation reference signal pattern, an antenna port and a scrambling identity of a reference signal sequence allocated for the user equipment.

In an existing standard, there are four demodulation reference signal patterns allocated for a user equipment, i.e., the Rank-2 pattern, the first Rank-4 pattern, the second Rank-4 pattern and the Rank-8 pattern, which correspondingly support at most two antenna ports, four antenna ports, four antenna ports and eight antenna ports allocated for the user equipment respectively, where the number of allocated antenna ports is the value of a rank.

Figure 1:
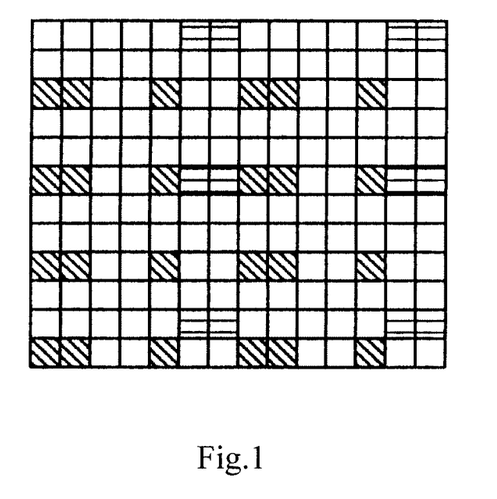
FIG. 1 is a schematic diagram of the Rank-2 pattern.

FIG. 1 illustrates a schematic diagram of the Rank-2 pattern, where the horizontal axis represents time and the vertical axis represents frequency, and each small square in the figure represents a Resource Element (RE), a square shadowed with inclined strips is a location where a common reference signal is located, and a square shadowed with horizontal strips is a location where a user equipment-specific demodulation reference signal is located; and among twelve squares REs shadowed with horizontal strips in the Rank-2 pattern, every two REs, adjacent in the time domain, of the same frequency subcarrier constitute a group, and are distinguished by an orthogonal code OCC length of 2 in combination with an indicated reference signal sequence, that is, allocation of at most two antenna ports for a user equipment can be supported.

Figure 2:
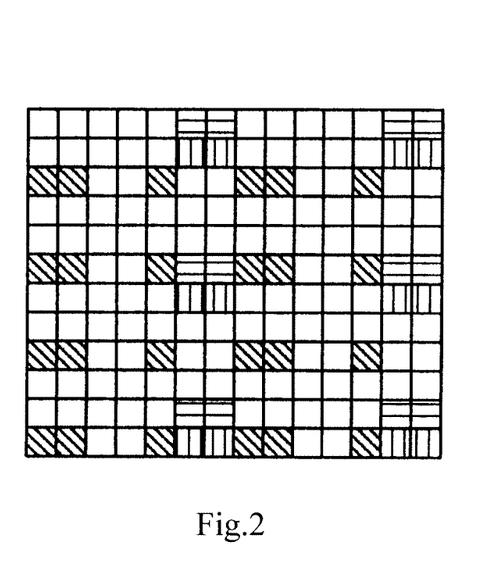
FIG. 2 is a schematic diagram of the first Rank-4 pattern.

FIG. 2 a schematic diagram of the first Rank-4 pattern, where a square shadowed with vertical strips is a location, where an added user equipment-specific demodulation reference signal relative to the Rank-2 pattern is located; and among twenty-four squares REs shadowed with horizontal strips and squares REs shadowed with vertical strips in the first Rank-4 pattern, every two REs, adjacent in the time domain, of the same frequency subcarrier constitute a group, and are distinguished by an OCC with a length of 2 in combination with an indicated reference signal sequence, that is, allocation of at most four antenna ports for a user equipment can be supported.

Figure 3:
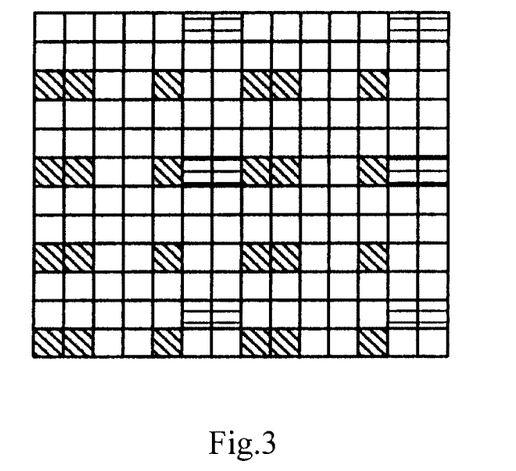
FIG. 3 is a schematic diagram of the second Rank-4 pattern.

FIG. 3 a schematic diagram of the second Rank-4 pattern, where the number of user equipment-specific demodulation reference signals and their locations are the same as in the Rank-2 pattern illustrated in FIG. 1, but among twelve squares REs shadowed with horizontal strips in the second Rank-4 pattern, four REs, in the time domain, of the same frequency subcarrier constitute a group, and are distinguished by an OCC with a length of 4 in combination with an indicated reference signal sequence, that is, allocation of at most four antenna ports for a user equipment can be supported.

Figure 4:
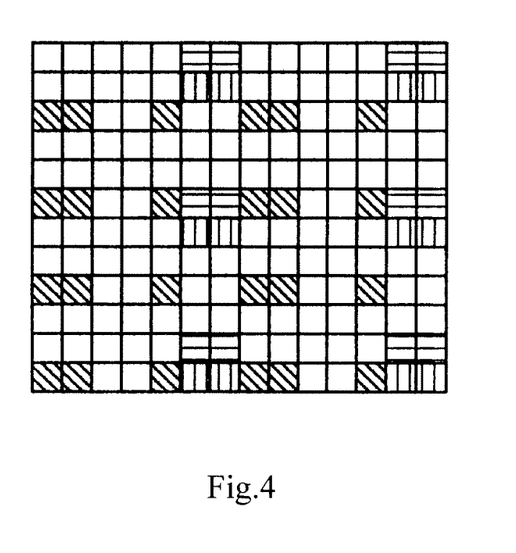
FIG. 4 is a schematic diagram of the Rank-8 pattern.

FIG. 4 a schematic diagram of the Rank-8 pattern, where the number of user equipment-specific demodulation reference signals and their locations are the same as in the first Rank-4 pattern illustrated in FIG. 2, but among twenty-four user equipment-specific demodulation reference signals in the Rank-8 pattern, four user equipment-specific demodulation reference signals, in the time domain, of the same frequency subcarrier constitute a group, and are distinguished by an OCC with a length of 4 in combination with an indicated reference signal sequence, that is, allocation of at most eight antenna ports for a user equipment can be supported.

Two reference signal sequences allocated for a user equipment are further defined in the existing standard and can be distinguished and identified by two different scrambling identities.

Based upon the forgoing existing standard, when a user equipment-specific demodulation reference signal is indicated, a user equipment has to be notified from the network side of which demodulation reference signal pattern of the foregoing three or four demodulation reference signal patterns is a demodulation reference signal pattern allocated for the user equipment, an antenna port allocated for the user equipment and which scrambling identity of the two scrambling identities is a scrambling identity of a reference signal sequence allocated for the user equipment.

Thus if a demodulation reference signal pattern, an antenna port and a scrambling identity of a reference signal sequence allocated for a user equipment could be arbitrarily selected and combined when a user equipment-specific demodulation reference signal is indicated, then it will means a large number of allocation schemes, thus resulting in a considerable overhead of signaling for indicating the user equipment-specific demodulation reference signal and wasting resources of a system.

SUMMARY OF THE INVENTION

Embodiments of the invention provide a method, device and system for indicating a user equipment-specific demodulation reference signal so as to reduce an overhead of signaling for indicating the user equipment-specific demodulation reference signal and further reduce wasted resources of a system.

An embodiment of the invention provides a method for indicating a user equipment-specific demodulation reference signal, which includes:

generating at the network side signal indication information indicating information on a demodulation reference signal pattern, information on an antenna port and a scrambling identity of a reference signal sequence allocated for a user equipment based upon Transport Block, TB, indication information of TBs and control information of a plurality of bits; and transmitting the generated signal indication information to the user equipment.

An embodiment of the invention further provides a user equipment including:

a receiving unit configured to receive signal indication information transmitted from the network side; and a determining unit configured to determine information on a demodulation reference signal pattern, information on an antenna port and a scrambling identity of a reference signal sequence allocated for the user equipment according to Transport Block, TB, indication information of TBs and control information of a plurality of bits carried in the signal indication information.

An embodiment of the invention further provides a system for indicating a user equipment-specific demodulation reference signal, which includes an indication device and a user equipment, wherein:

the indicating device is configured to generate signal indication information and to transmit the generated signal indication information to the user equipment; and the user equipment is configured to determine information on a demodulation reference signal pattern, information on an antenna port and a scrambling identity of a reference signal sequence allocated for the user equipment according to Transport Block, TB, indication information of TBs, and control information of a plurality of bits carried in the received signal indication information.

In the method according to the embodiment of the invention, signal indication information is generated at the network side and the generated signal indication information is transmitted to a user equipment, and the user equipment determines information on a demodulation reference signal pattern, information on an antenna port and a scrambling identity of a reference signal sequence allocated for the user equipment according to Transport Block (TB) indication information of TBs and control information of a plurality of bits carried in the signal indication information upon reception thereof; and since TB indication information defined in the existing standard is used to indicate a demodulation reference signal pattern, an antenna port and a scrambling identity of a reference signal sequence allocated for the user equipment in the method according to the embodiment of the invention, both control signaling dedicated to indicating a user equipment-specific demodulation reference signal and an overhead of signaling for indicating a user equipment-specific demodulation reference signal is reduced and further wasted resources of a system are reduced as compared with the prior art.

DETAILED DESCRIPTION OF THE EMBODIMENTS

In Rank to present an implementation solution to reducing an overhead of signaling for indicating a user equipment-specific demodulation reference signal, embodiments of the invention provide a method, device and system for indicating a user equipment-specific demodulation reference signal, and preferred embodiments of the invention will be described below with reference to the drawings. It shall be appreciated that the preferred embodiments described here are merely intended to describe and explain but not to limit the invention. The embodiments in this application and features in the embodiments can be combined with each other without any confliction.

Figure 5:
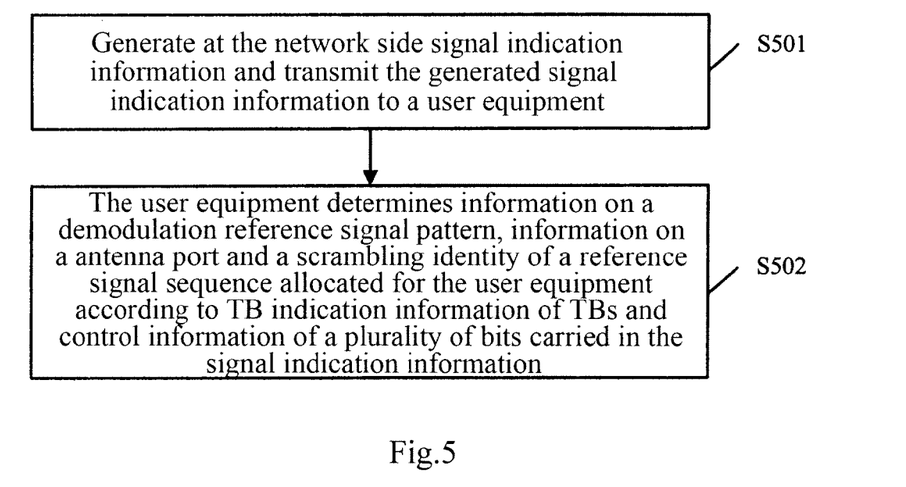
FIG. 5 is a flow chart of a method for indicating a user equipment-specific demodulation reference signal according to embodiments of the invention.

An embodiment of the invention provides a method for indicating a user equipment-specific demodulation reference signal, which as illustrated in FIG. 5 includes:

Step S501. Signal indication information is generated at the network side, and the generated signal indication information is transmitted to a user equipment.

Step S502. The user equipment determines information on a demodulation reference signal pattern, information on an antenna port and a scrambling identity of a reference signal sequence allocated for the user equipment according to TB indication information of TBs and control information of a plurality of bits carried in the received signal indication information.

A method, device and system according to the invention will be described below in details in connection with particular embodiments.

First Embodiment

Figure 6:
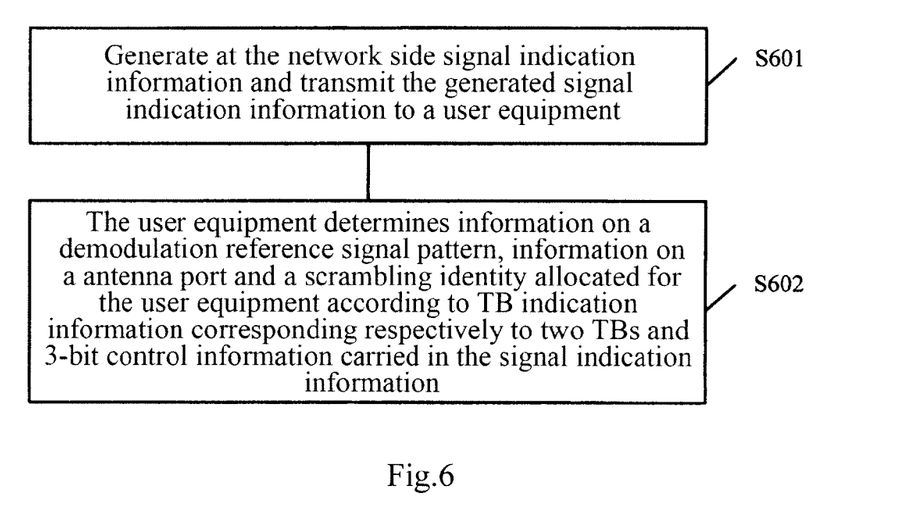
FIG. 6 is a flow chart of a method for indicating a user equipment-specific demodulation reference signal according to a first embodiment of the invention.

The first embodiment of the invention provides a method for indicating a user equipment-specific demodulation reference signal, which as illustrated in FIG. 6 includes:

Step S601. Signal indication information is generated at the network side, and the generated signal indication information is transmitted to a user equipment.

Step S602. The user equipment determines a demodulation reference signal pattern which is one of the Rank-2 pattern, the first Rank-4 pattern and the Rank-8 pattern, an antenna port and a scrambling identity of a reference signal sequence which is one of two scrambling identities, allocated for the user equipment according to TB indication information corresponding respectively to two TBs and 3-bit control information carried in the received signal indication information.

Particularly the Rank-2 pattern is a pattern for allocation of one or two antenna ports, the first Rank-4 pattern is a pattern for allocation of three or four antenna ports, and the Rank-8 pattern is a pattern for allocation of five, six, seven or eight antenna ports.

The method according to the first embodiment of the invention will be described below in details.

The existing standard sets a first working assumption including: at most four user equipments are scheduled concurrently; no more than two antenna ports are allocated for each user equipment; and at most four antenna ports in total are allocated concurrently from the network side for a plurality of user equipments in the case of MU-MIMO.

Based upon the foregoing first working assumption, when one or two antenna ports are allocated for a user equipment, the Rank-2 pattern is defined for use, and at this time a plurality of user equipments can be paired, then the antenna ports can be combined in the following several schemes:

In a first scheme, one antenna port is allocated for each user equipment, and allocation of one antenna port respectively for at most four user equipments can be supported, and corresponding reference signal information includes: (antenna port 0, scrambling identity0), (antenna port 1, scrambling identity0), (antenna port 0, scrambling identity1) and (antenna port 1, scrambling identity1).

In a second scheme, two antenna ports are allocated for one user equipment, and one antenna port is allocated for a second user equipment, and corresponding reference signal information includes: (antenna port 0-1, scrambling identity0) and (antenna port 0, scrambling identity 1).

In a third scheme, two antenna ports are allocated for one user equipment, one antenna port is allocated for a second user equipment, and one antenna port is allocated for a third user equipment, and corresponding reference signal information includes: (antenna port 0-1, scrambling identity0), (antenna port 0, scrambling identity1) and (antenna port 1, scrambling identity 1).

In a fourth scheme, two antenna ports are located for both user equipments, and corresponding reference signal information includes: (antenna port 0-1, scrambling identity0) and (antenna port 0-1, scrambling identity1).

As can be apparent, user equipment-specific demodulation reference signal information allocated for a user equipment includes two allocations of two antenna ports and four allocations of one antenna port, that is, six statuses in total are sufficient to indicate all of the possible allocation schemes of information on a pattern, information on an antenna port and a scrambling identity allocated for the user equipment in the Rank-2 pattern.

Based upon the foregoing working assumption, when three or four antenna ports are allocated for a user equipment, the first Rank-4 pattern is defined for use, and since the number of antenna ports allocated for a user equipment is more than two at this time, it implicitly indicates that the user equipment will not be paired with another user equipment, that is, no other user equipment will use the same antenna port as the user equipment, so no reference signal sequence will be distinguished, that is, a default scrambling identity can be used, for example, the scrambling identity0 or the scrambling identity1, and three antenna ports including the antenna ports 0-2 or four antenna ports including the antenna ports 0-3 are defined to be allocated for a user equipment, then the antenna ports can be combined in the following several schemes:

In a first scheme, three antenna ports are allocated for a user equipment, and the allocated antenna ports are: (antenna ports 0-2, default scrambling identity); and In a second scheme, four antenna ports are allocated for a user equipment, and the allocated antenna ports are: (antenna ports 0-3, default scrambling identity).

As can be apparent, user equipment-specific demodulation reference signal information allocated for a user equipment includes one allocation of three antenna ports and one allocation of four antenna ports, that is, two statuses in total are sufficient to indicate all of the possible allocation schemes of information on a pattern, information on an antenna port and a scrambling identity allocated for the user equipment in the first Rank-4 pattern.

Based upon the foregoing working assumption, when five, six, seven or eight antenna ports are allocated for a user equipment, the Rank-8 pattern is defined for use, and since the number of antenna ports allocated for a user equipment is more than two at this time, it implicitly indicates that the user equipment will not be paired with another user equipment, that is, no other user equipment will use the same antenna port as the user equipment, so no reference signal sequence will be distinguished, that is, a default scrambling identity can be used, for example, the scrambling identity0 or the scrambling identity1, and five antenna ports including the antenna ports 0-4, sixth antenna ports including the antenna ports 0-5, seven antenna ports including the antenna ports 0-6 and eight antenna ports including all of the antenna ports 0-7 are defined to be allocated for a user equipment, then the antenna ports can be combined in the following several schemes:

In a first scheme, five antenna ports are allocated for a user equipment, and the allocated antenna ports are: (antenna ports 0-4, default scrambling identity);

In a second scheme, six antenna ports are allocated for a user equipment, and the allocated antenna ports are: (antenna ports 0-5, default scrambling identity);

In a third scheme, seven antenna ports are allocated for a user equipment, and the allocated antenna ports are: (antenna ports 0-6, default scrambling identity); and In a fourth scheme, eight antenna ports are allocated for a user equipment, and the allocated antenna ports are: (antenna ports 0-7, default scrambling identity);

As can be apparent, user equipment-specific demodulation reference signal information allocated for a user equipment includes one allocation of five antenna ports, one allocation of six antenna ports, one allocation of seven antenna ports and one allocation of eight antenna ports, that is, four statuses in total are sufficient to indicate all of the possible allocation schemes of information on a pattern, information on an antenna port and a scrambling identity allocated for the user equipment in the Rank-8 pattern.

The foregoing various allocation schemes are summarized in Table 1 below:

TABLE 1

| Used pattern, the number of antenna ports | Antenna port, scrambling code | The number of statuses |
|---|---|---|
| Rank-2 pattern, 1 antenna port | Antenna port 0 or 1, scrambling identity0 or ID1 | 4 statuses |
| Rank-2 pattern, 2 antenna ports | Ports 0-1, scrambling identity0 or ID1 | 2 statuses |
| First Rank-4 pattern, 3 antenna ports | Ports 0-2, default scrambling code | 1 statuses |
| Second Rank-4 pattern, 4 antenna ports | Ports 0-3, default scrambling code | 1 statuses |
| Rank-8 pattern, 5, 6, 7 or 8 antenna ports | Ports 0-4, 5, 6 or 7, default scrambling code | 4 statuses |

As can be apparent from Table 1, twelve statuses are required to correspondingly indicate twelve possible allocation schemes based upon the foregoing first working assumption.

A second working assumption is further set in the existing standard and includes at most two TBs (TB1 and TB2) are used for each user, the number of which is no more than the number of antenna ports allocated for the user, and two TBs are used for data transmission when more than four antenna ports are allocated for the user.

Based upon the second working assumption, when one antenna port is allocated for a user equipment in the Rank-2 pattern, only one TB can be used, and the indication information of the other unused TB can distinguish an antenna port (particularly a New Data Indicator (NDI) bit in the unused TB can be used for distinguishing), and only further control information will be required to indicate a pattern and a scrambling identity in use.

With the use of both the Rank-2 pattern and two TBs, two antenna ports are allocated indeed for a user equipment, and only further control information will be required to indicate a pattern and a scrambling identity in use. In the present first embodiment, it can be defined that two TBs must be used when two antenna ports are allocated for a user equipment without indicating a scenario in which two antenna ports are allocated and one TB is used; or it can be defined that one TB must be used without indicating a scenario in which two antenna ports are allocated and two TBs are used; or neither of the definitions applies, that is, one TB (TB1 or TB2) can be used or two TBs can be used when two antenna ports are allocated for a user equipment.

When three or four antenna ports are allocated for a user equipment in the first Rank-4 pattern, no paring of a plurality of users is supported, and then only further control information will be required to indicate a pattern and the number of antenna ports in use.

Also when five, six, seven or eight antenna ports are allocated for a user equipment in the Rank-8 pattern, no paring of a plurality of users is supported, and only further control information will be required to indicate a pattern and the number of antenna ports in use.

Based upon the foregoing analysis, in the present first embodiment, further 3-bit control information (providing at most eight pieces of control information) can provide at least twelve pieces of indication information in combination with the TB indication information of two TBs, so for the twelve allocation schemes to be indicated of a pattern, an antenna port and a scrambling identity allocated for a user equipment, these twelve pieces of indication information can be used to correspondingly indicate the twelve allocation schemes respectively, for example:

Particularly the TB indication information of two TBs can come to one of the following two scenarios:

In a first scenario, first TB indication information representing used TB1 and second TB indication information representing used TB2; and In a second scenario, first TB indication information representing used TB1, third TB indication information representing unused TB2 and an NDI bit in the third TB indication information.

For the 3-bit control information, the meaning represented by each bit can be as illustrated in Table 2 below:

TABLE 2

| Bit 1 | Bit 2 | Bit 3 | |
|---|---|---|---|
| 0 (Rank-2 or first Rank-4 pattern) 1 (Rank-8 pattern) | 0 (Rank-2 pattern) 1 (first Rank-4 pattern) 00 (default scrambling code, 5 antenna ports) | 0 (scrambling identity0) 0 (default scrambling code, 3 antenna ports) 01 (default scrambling code, 6 antenna ports) | 1 (scrambling identity1) 1 (default scrambling code, 4 antenna ports) 10 (default scrambling code, 7 antenna ports) 11 (default scrambling code, 8 antenna ports) |

Table 3 below is a comparison table indicating the foregoing twelve allocation schemes based upon Table 2 together with the use of TB indication information of TB1 and TB2 and 3-bit control information for joint indication as follows:

TABLE 3

| Status sequence number | Pattern, antenna port, scrambling identity, the number of TBs | Signal indication information (TB indication information, 3-bit control information) |
|---|---|---|
| 1 | Rank-2 pattern, antenna port 0, scrambling identity0, one TB | TB1 and NID bit "0" of TB2, 000 |
| 2 | Rank-2 pattern, antenna port 0, scrambling identity1, one TB | TB1 and NID bit "0" of TB2, 001 |
| 3 | Rank-2 pattern, antenna port 1, scrambling identity0, one TB | TB1 and NID bit "1" of TB2, 000 |
| 4 | Rank-2 pattern, antenna port 1, scrambling identity1, one TB | TB1 and NID bit "1" of TB2, 001 |
| 5 | Rank-2 pattern, antenna ports 0-1, scrambling identity0, two TBs | TB1 and TB2, 000 |
| 6 | Rank-2 pattern, antenna ports 0-1, scrambling identity1, two TBs | TB1 and TB2, 001 |
| 7 | First Rank-4 pattern, antenna ports 0-2, default scrambling code, one TB | TB1, 010 |
| 8 | First Rank-4 pattern, antenna ports 0-2, default scrambling code, two TBs | TB1 and TB2, 010 |
| 9 | First Rank-4 pattern, antenna ports 0-3, default scrambling code, one TB | TB1, 011 |
| 10 | First Rank-4 pattern, antenna ports 0-3, default scrambling code, two TBs | TB1 and TB2, 011 |
| 11 | Rank-8 pattern, antenna ports 0-4, default scrambling code, two TBs | TB1 and TB2, 100 |
| 12 | Rank-8 pattern, antenna ports 0-5, default scrambling code, two TBs | TB1 and TB2, 101 |
| 13 | Rank-8 pattern, antenna ports 0-6, default scrambling code, two TBs | TB1 and TB2, 110 |
| 14 | Rank-8 pattern, antenna ports 0-7, default scrambling code, two TBs | TB1 and TB2, 111 |
| 15 | Rank-2 pattern, antenna ports 0-1, scrambling identity0, one TB | TB1, 100 |
| 16 | Rank-2 pattern, antenna ports 0-1, scrambling identity1, one TB | TB1, 101 |

In table 3, taking the status 1 as an example, the signal indication information in the table "TB1 and NDI bit "0" of TB2, 000" represent used TB1, unused TB2, an NDI bit of TB2 being 0, 3-bit control information of 000 and the correspondingly indicated Rank-2 pattern, antenna port 0 and scrambling identity0 allocated for a user equipment; and taking the status 5 as an example, the signal indication information in the table "TB1 and TB2, 000" represent used TB1, used TB2, 3-bit control information of 000 and the correspondingly indicated Rank-2 pattern, antenna ports 0-1 and scrambling identity0 allocated for a user equipment. The indication information of the other statuses represents similar meaning and will not be described here in details.

As can be apparent from Table 3, there are twelve allocation schemes of a pattern, an antenna port and a scrambling identity allocated for a user equipment, but some specific allocation schemes are related to a scenario with one or two TBs in use, for example, the status 7 and the status 8, the status 9 and the status 10, the status 5 and the status 15, and the status 6 and the status 16, so finally sixteen allocation schemes are required to be indicated in view of a scenario with one or two TBs in use.

For Table 3, the status 15 and the status 16 shall be particularly noted, and in the first embodiment of the invention, it can be defined that neither of the allocation schemes represented by the status 15 and the status 16 will be allocated for a user equipment, so the status 15 and the status 16 will not be indicated, and they will be indicated only if this definition does not apply and can be indicated in the 3-bit control information unused in the statuses 1 to 14, for example, specific indication information can be as depicted in Table 3.

In the first embodiment of the invention, the TB indication information of two TBs can also come to one of the following two scenarios:

In a first scenario, first TB indication information representing used TB1 and second TB indication information representing used TB2; and In a second scenario, first TB indication information representing used TB1 and third TB indication information representing unused TB2.

That is, an NDI bit in the third TB indication information will not be required in the second scenario, and for details of how to indicate the twelve allocation schemes to be indicated of a pattern, an antenna port and a scrambling identity allocated for a user equipment jointly based upon the TB indication information in the two scenarios and the 3-bit control information, reference can be made to for the principle in Table 2 and Table 3 above, and a detailed description thereof will be omitted here.

In the present first embodiment, the indication solution depicted in Table 1 above is based upon the foregoing two scenarios of the TB indication information of two TBs and the meaning represented by each bit of the 3-bit control information in Table 2, and in another embodiment, another specific indication solution can be adopted, that is, the TB indication information of two TBs and the 3-bit control information adopted for each status will not be particularly defined so long as the status can be distinguished.

As can be ascertained from the foregoing description, a user equipment-specific demodulation reference signal can be indicated in the present first embodiment by the TB indication information of two TBs and the 3-bit control information in the solution according to the present first embodiment, and an overhead of signaling for indicating a user equipment-specific demodulation reference signal is reduced and further wasted resources of a system are reduced as compared with the prior art.

Second Embodiment

Figure 7:
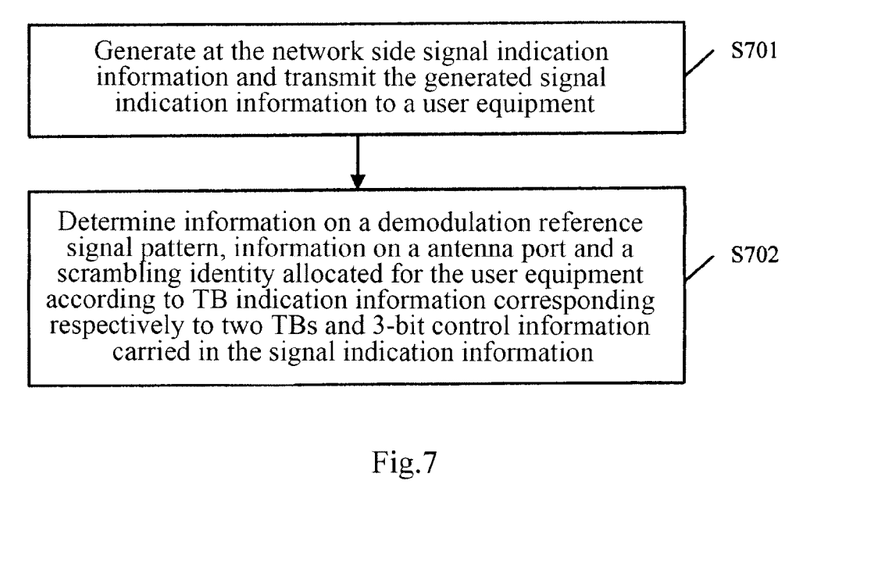
FIG. 7 is a flow chart of a method for indicating a user equipment-specific demodulation reference signal according to a second embodiment of the invention.

The second embodiment of the invention further provides a method for indicating a user equipment-specific demodulation reference signal, which as illustrated in FIG. 7 includes:

Step S701. Signal indication information is generated at the network side, and the generated signal indication information is transmitted to a user equipment.

Step S702. The user equipment determines a demodulation reference signal pattern which is one of the Rank-2 pattern, the first Rank-4 pattern, the second Rank-4 pattern and the Rank-8 pattern, an antenna port and a scrambling identity of a reference signal sequence which is one of two scrambling identities, allocated for the user equipment according to TB indication information corresponding respectively to two TBs and 3-bit control information carried in the received signal indication information.

Particularly the Rank-2 pattern is a pattern for allocation of one or two antenna ports, the first Rank-4 pattern is a pattern for allocation of three or four antenna ports, the second Rank-4 pattern is a pattern for allocation of one or two antenna ports, and the Rank-8 pattern is a pattern for allocation of five, six, seven or eight antenna ports.

The method according to the second embodiment of the invention will be described below in details.

Based upon the first working assumption in the first embodiment, when one or two antenna ports are allocated for a user equipment, the second Rank-4 pattern can also be used, and at this time a plurality of user equipments can be paired, and the antenna ports can be combined in the following several schemes:

In a first scheme, one antenna port is allocated for each user equipment, and allocation of antenna ports for at most four user equipments can be supported, and the allocated antenna ports include: (antenna port 0, default scrambling code), (antenna port 1, default scrambling code), (antenna port 2, default scrambling code) and (antenna port 3, default scrambling code); and In a second scheme, two antenna ports are allocated for each user equipment, and the allocated antenna ports include: (antenna ports 0-1, default scrambling code) and (antenna ports 2-3, default scrambling code).

As can be apparent, user equipment-specific demodulation reference signal information allocated for a user equipment includes four allocations of one antenna port and two allocations of two antenna ports, that is, six statuses in total are sufficient to indicate all of the possible allocation schemes of information on a pattern, information on an antenna port and a scrambling identity allocated for the user equipment in the second Rank-4 pattern.

In combination with the twelve possible allocation schemes in the first embodiment, eighteen statuses are required to correspondingly indicate eighteen possible allocation schemes in the present second embodiment.

Based upon the second working assumption in the first embodiment, when one antenna port is allocated for a user equipment in the second Rank-4 pattern, only one TB can be used, and the indication information of the other unused TB can distinguish an antenna port (particularly a New Data Indicator (NDI) bit of the unused TB can be used for distinguishing), and it will be only required to further indicate a pattern in use.

With the use of both the second Rank-4 pattern and two TBs, two antenna ports are allocated indeed for a user equipment, and it will be only required to further indicate a pattern in use. In the present first embodiment, it can be defined that two TBs must be used when two antenna ports are allocated for a user equipment without indicating a scenario in which two antenna ports are allocated and one TB is used; or it can be defined that one TB must be used without indicating a scenario in which two antenna ports are allocated and two TBs are used; or neither of the definitions applies, that is, one TB (TB1 or TB2) can be used or two TBs can be used when two antenna ports are allocated for a user equipment.

Based upon the foregoing analysis, in the present second embodiment, further 3-bit control information (providing at most eight pieces of control information) can provide at least eighteen pieces of indication information in combination with the TB indication information of two TBs, so for the eighteen allocation schemes to be indicated of a pattern, an antenna port and a scrambling identity allocated for a user equipment, these eighteen pieces of indication information can be used to correspondingly indicate the eighteen allocation schemes respectively, for example:

Particularly the TB indication information of two TBs can come to one of the following three scenarios:

In a first scenario, first TB indication information representing used TB1 and second TB indication information representing used TB2;

In a second scenario, first TB indication information representing used TB1, third TB indication information representing unused TB2 and an NDI bit in the third TB indication information; and In a third scenario, fourth TB indication information representing unused TB1, second TB indication information representing used TB2 and an NDI bit in the fourth TB indication information.

In the present second embodiment, the foregoing six additional allocation schemes in the second Rank-4 pattern are indicated based upon Table 3 in the first embodiment, as depicted in Table 4 below:

TABLE 4

| Status sequence number | Pattern, antenna port, scrambling identity, the number of TBs | Signal indication information (TB indication information, 3-bit control information) |
|---|---|---|
| 17 | Second Rank-4 pattern, antenna port 0, default scrambling code, one TB | TB2 and NDI bit "0" of TB1, 000 |
| 18 | Second Rank-4 pattern, antenna port 1, default scrambling code, one TB | TB2 and NDI bit "0" of TB1, 001 |
| 19 | Second Rank-4 pattern, antenna port 2, default scrambling code, one TB | TB2 and NDI bit "1" of TB1, 000 |
| 20 | Second Rank-4 pattern, antenna port 3, default scrambling code, one TB | TB2 and NDI bit "1" of TB1, 001 |
| 21 | Second Rank-4 pattern, antenna ports 0-1, default scrambling code, one TB | TB2, 010 |
| 22 | Second Rank-4 pattern, antenna ports 2-3, default scrambling code, one TB | TB2, 001 |
| 23 | Second Rank-4 pattern, antenna ports 0-1, default scrambling code, two TBs | TB1 and TB2, 000 |
| 24 | Second Rank-4 pattern, antenna ports 2-3, default scrambling code, two TBs | TB1 and TB2, 001 |

As can be apparent from Table 4, there are six allocation schemes of a pattern, an antenna port and a scrambling identity allocated for a user equipment, but some specific allocation schemes are related to a scenario with one or two TBs in use, for example, the status 21 and the status 23, and the status 22 and the status 24, so finally eight allocation schemes are required to be indicated in view of a scenario with one or two TBs in use.

In the second embodiment of the invention, it can be defined that neither of the allocation schemes represented by the status 23 and the status 24 will be allocated for a user equipment, so the status 23 and the status 24 will not be indicated, and they will be indicated only if this definition does not apply and specific indication information can be as depicted in Table 4. However at this time the signal indication information corresponding to the status 23 is the same as the signal indication information of the status 5 in Table 3, and the signal indication information corresponding to the status 24 is the same as the signal indication information of the status 6 in Table 3, so in the second embodiment of the invention, it is required to define that only one of the combination of the status 5 and the status 6 and the combination of the status 23 and the status 24 will be used and the other combination will not be used.

In the present second embodiment, the indication solution depicted in Table 4 above is based upon Table 3, and in another embodiment, another specific indication solution can be adopted, that is, the TB indication information of two TBs and the 3-bit control information adopted for each status will not be particularly defined so long as the status can be distinguished.

At this time a user equipment-specific demodulation reference signal can be indicated in the present second embodiment by the TB indication information of two TBs and the 3-bit control information, and an overhead of signaling for indicating a user equipment-specific demodulation reference signal is reduced and further wasted resources of a system are reduced as compared with the prior art.

Third Embodiment

Figure 8:
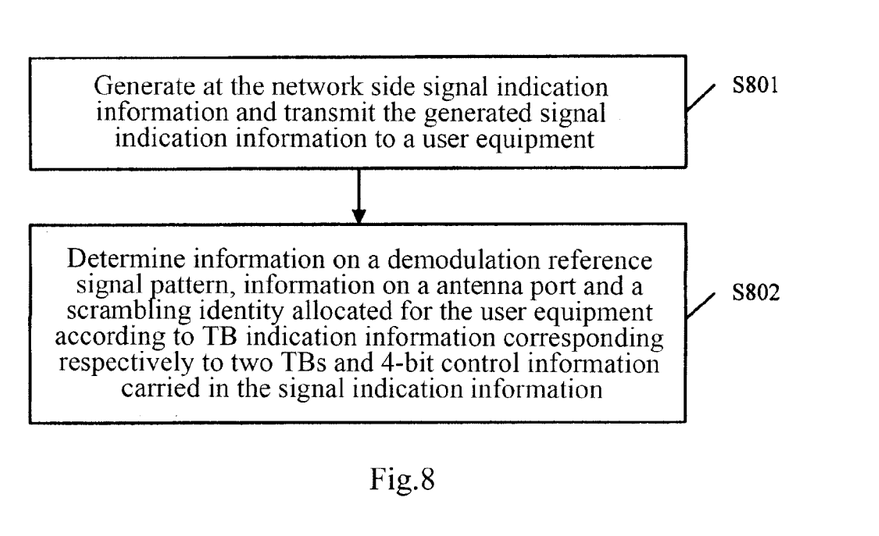
FIG. 8 is a flow chart of a method for indicating a user equipment-specific demodulation reference signal according to a third embodiment of the invention.

In the foregoing second embodiment, only one of the combination of the status 5 and the status 6 and the combination of the status 23 and the status 24 can be selected, and in Rank to indicate all of the status 5, the status 6, the status 23 and the status 24, the present third embodiment further provides a method for indicating a user equipment-specific demodulation reference signal, which as illustrated in FIG. 8 includes:

Step S801. Signal indication information is generated at the network side, and the generated signal indication information is transmitted to a user equipment.

Step S802. The user equipment determines a demodulation reference signal pattern which is one of the Rank-2 pattern, the first Rank-4 pattern, the second Rank-4 pattern and the Rank-8 pattern, an antenna port and a scrambling identity of a reference signal sequence which is one of two scrambling identities, allocated for the user equipment according to TB indication information corresponding respectively to two TBs and 4-bit control information carried in the received signal indication information.

Particularly the Rank-2 pattern is a pattern for allocation of one or two antenna ports, the first Rank-4 pattern is a pattern for allocation of three or four antenna ports, the second Rank-4 pattern is a pattern for allocation of one or two antenna ports, and the Rank-8 pattern is a pattern for allocation of five, six, seven or eight antenna ports.

The method according to the third embodiment of the invention will be described below in details.

Based upon the first working assumption and the second working assumption, for an analysis of possible allocation schemes of a pattern, an antenna port and a scrambling identity allocated for a user equipment, reference can be made to the foregoing first embodiment and second embodiment, i.e., the eighteen allocation schemes in total, and in the present third embodiment, further 4-bit control information (providing at most sixteen pieces of control information) can provide at least eighteen pieces of indication information in combination with the TB indication information of two TBs, so for the eighteen allocation schemes to be indicated of a pattern, an antenna port and a scrambling identity allocated for a user equipment, these eighteen pieces of indication information can be used to correspondingly indicate the eighteen allocation schemes respectively, for example:

Particularly the TB indication information of two TBs can come to one of the following two scenarios:

In a first scenario, first TB indication information representing used TB1 and second TB indication information representing used TB2; and In a second scenario, first TB indication information representing used TB1, third TB indication information representing unused TB2 and an NDI bit in the third TB indication information.

For the 4-bit control information, the meaning represented by each bit can be as illustrated in Table 5 below:

TABLE 5

| Bit 1 | Bit 2 | Bit 3 | Bit 4 | | |
|---|---|---|---|---|---|
| 00 (Rank-2 pattern) | 0 (1 antenna port) | 0 (scrambling identity0) | 1 (scrambling identity1) | | |
| | 1 (2 antenna ports) | 0 (scrambling identity0) | 1 (scrambling identity1) | | |
| 01 (second Rank-4 pattern) | 0 (1 antenna port) | 0 (antenna port 0 or 1) | 1 (antenna port 2 or 3) | | |
| 10 (first Rank-4 pattern) | 1 (2 antenna ports) | 0 (antenna ports 0-1) | 1 (antenna ports 2-3) | | |
| | Either 0 or 1 | 0 (default scrambling code, 3 antenna ports) | 1 (default scrambling code, 4 antenna ports) | | |
| 11 (Rank-8 pattern) | 00 (default scrambling code, 5 antenna ports) | 01 (default scrambling code, 6 antenna ports) | 10 (default scrambling code, 7 antenna ports) | 11 (default scrambling code, 8 antenna ports |

Table 6 below is a comparison table indicating the foregoing eighteen allocation schemes based upon Table 5 together with the use of TB indication information of TB1 and TB2 and 4-bit control information for joint indication as follows:

TABLE 6

| Status sequence number | Pattern, antenna port, scrambling identity, the number of TBs | Signal indication information (TB indication information, 4-bit control information) |
|---|---|---|
| 1 | Rank-2 pattern, antenna port 0, scrambling identity0, one TB | TB1 and NDI bit "0" of TB2, 0000 |
| 2 | Rank-2 pattern, antenna port 0, scrambling identity1, one TB | TB1 and NDI bit "0" of TB2, 0001 |
| 3 | Rank-2 pattern, antenna port 1, scrambling identity0, one TB | TB1 and NDI bit "1" of TB2, 0000 |
| 4 | Rank-2 pattern, antenna port 1, scrambling identity1, one TB | TB1 and NDI bit "1" of TB2, 0001 |
| 5 | Rank-2 pattern, antenna ports 0-1, scrambling identity0, two TBs | TB1 and TB2, 0010 |
| 6 | Rank-2 pattern, antenna ports 0-1, scrambling identity1, two TBs | TB1 and TB2, 0011 |
| 7 | First Rank-4 pattern, antenna ports 0-2, default scrambling code, one TB | TB1, 1000 |
| 8 | First Rank-4 pattern, antenna ports 0-2, default scrambling code, two TBs | TB1 and TB2, 1000 |
| 9 | First Rank-4 pattern, antenna ports 0-3, default scrambling code, one TB | TB1, 1001 |
| 10 | First Rank-4 pattern, antenna ports 0-3, default scrambling code, two TBs | TB1 and TB2, 1001 |
| 11 | Rank-8 pattern, antenna ports 0-4, default scrambling code, two TBs | TB1 and TB2, 1100 |
| 12 | Rank-8 pattern, antenna ports 0-5, default scrambling code, two TBs | TB1 and TB2, 1101 |
| 13 | Rank-8 pattern, antenna ports 0-6, default scrambling code, two TBs | TB1 and TB2, 1110 |
| 14 | Rank-8 pattern, antenna ports 0-7, default scrambling code, two TBs | TB1 and TB2, 1111 |
| 15 | Rank-2 pattern, antenna ports 0-1, scrambling identity0, one TB | TB1 or TB2, 0010 |
| 16 | Rank-2 pattern, antenna ports 0-1, scrambling identity1, one TB | TB1 or TB2, 0011 |
| 17 | Second Rank-4 pattern, antenna port 0, default scrambling code, one TB | TB1 and NDI bit "0" of TB2, 0100 |
| 18 | Second Rank-4 pattern, antenna port 1, default scrambling code, one TB | TB1 and NDI bit "0" of TB2, 0101 |
| 19 | Second Rank-4 pattern, antenna port 2, default scrambling code, one TB | TB1 and NDI bit "1" of TB2, 0100 |
| 20 | Second Rank-4 pattern, antenna port 3, default scrambling code, one TB | TB1 and NDI bit "1" of TB2, 0101 |
| 21 | Second Rank-4 pattern, antenna ports 0-1, default scrambling code, one TB | TB1 or TB2, 0110 |
| 22 | Second Rank-4 pattern, antenna ports 2-3, default scrambling code, one TB | TB1 or TB2, 0111 |
| 23 | Second Rank-4 pattern, antenna ports 0-1, default scrambling code, two TBs | TB1 and TB2, 0110 |
| 24 | Second Rank-4 pattern, antenna ports 2-3, default scrambling code, two TBs | TB1 and TB2, 0111 |

As can be apparent from Table 6, there are eighteen allocation schemes of a pattern, an antenna port and a scrambling identity allocated for a user equipment, but some specific allocation schemes are related to a scenario with one or two TBs in use, for example, the status 7 and the status 8, the status 9 and the status 10, the status 5 and the status 15, and the status 6 and the status 16, the status 21 and the status 23, and the status 22 and the status 24, so finally twenty-four allocation schemes are required to be indicated in view of a scenario with one or two TBs in use.

In the present third embodiment, the indication solution depicted in Table 6 above is based upon the foregoing two scenarios of the TB indication information of two TBs and the meaning represented by each bit of the 4-bit control information in Table 5, and in another embodiment, another specific indication solution can be adopted, that is, the TB indication information of two TBs and the 4-bit control information adopted for each status will not be particularly defined so long as the status can be distinguished.

As can be ascertained from the foregoing description, a user equipment-specific demodulation reference signal can be indicated in the present third embodiment by the TB indication information of two TBs and the 4-bit control information in the solution according to the present third embodiment, and an overhead of signaling for indicating a user equipment-specific demodulation reference signal is reduced and further wasted resources of a system are reduced as compared with the prior art.

Fourth Embodiment

Figure 9:
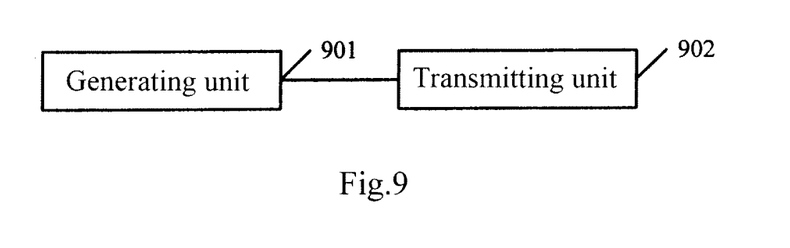
FIG. 9 is a schematic structural diagram of a device for indicating a user equipment-specific demodulation reference signal according to a fourth embodiment of the invention.

Based upon the same inventive idea, following the method for indicating a user equipment-specific demodulation reference signal according to the foregoing first, second and third embodiments of the invention, the fourth embodiment of the invention further provides a device for indicating a user equipment-specific demodulation reference signal with a structure as schematically illustrated in FIG. 9, and the device includes:

A generation unit 901 configured to generate signal indication information indicating information on a demodulation reference signal pattern, information on an antenna port and a scrambling identity of a reference signal sequence allocated for a user equipment based upon Transport Block (TB) indication information of TBs and control information of a plurality of bits; and A transmitting unit 902 configured to transmit the generated signal indication information to the user equipment.

Preferably the generating unit 901 is particularly configured to generate the signal indication information and to correspondingly indicate a total number N of allocation schemes respectively of the information on the demodulation reference signal pattern, the information on the antenna port and the scrambling identity of the reference signal sequence allocated for the user equipment based upon at least N pieces of indication information represented by the TB indication information of the TBs and the control information of the plurality of bits in combination, where the TB indication information of the TBs is TB indication information respectively corresponding to two TBs, and the control information of the plurality of bits is 3-bit or 4-bit control information; and the information on the demodulation reference signal pattern is information on one of predetermined at most four patterns, and the scrambling identity of the reference signal sequence is one of scrambling identities corresponding respectively to two predetermined reference signal sequences.

Figure 10:
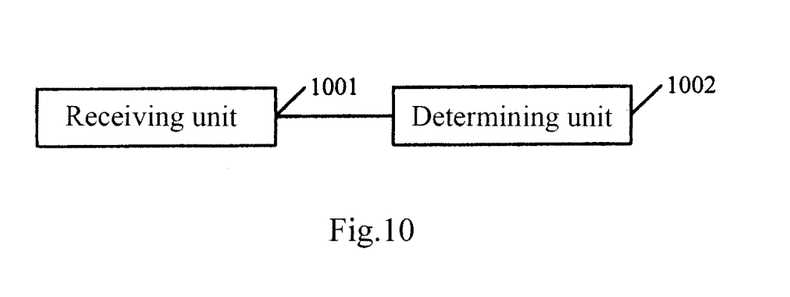
FIG. 10 is a schematic structural diagram of a user equipment according to the fourth embodiment of the invention.

Correspondingly the fourth embodiment of the invention further provides a user equipment with a structure as schematically illustrated in FIG. 10, and the user equipment includes:

A receiving unit 1001 configured to receive signal indication information transmitted from the network side; and A determining unit 1002 configured to determine information on a demodulation reference signal pattern, information on an antenna port and a scrambling identity of a reference signal sequence allocated for the user equipment according to Transport Block (TB) indication information of TBs and control information of a plurality of bits carried in the signal indication information.

Preferably the determining unit 1002 is particularly configured to correspondingly determine a total number N of allocation schemes respectively of the information on the demodulation reference signal pattern, the information on the antenna port and the scrambling identity of the reference signal sequence allocated for the user equipment according to at least N pieces of indication information represented by the TB indication information of the TBs and the control information of the plurality of bits in combination, carried in the signal indication information, where the TB indication information of the TBs is TB indication information corresponding respectively to two TBs, and the control information of the plurality of bits is 3-bit or 4-bit control information; and the information on the demodulation reference signal pattern is information on one of predetermined at most four patterns, and the scrambling identity of the reference signal sequence is one of scrambling identities corresponding respectively to two predetermined reference signal sequences.

Preferably the TB indication information corresponding respectively to the two TBs followed by the determining unit 1002 includes first TB indication information representing a used first TB and second TB indication information representing a used second TB; or First TB indication information representing a used first TB, third TB indication information representing an unused second TB and a New Data Indicator (NDI) bit in the third TB indication information.

Preferably the predetermined at most four patterns determined by the determining unit 1002 include the Rank-2 pattern, the first Rank-4 pattern and the Rank-8 pattern, where the Rank-2 pattern is a pattern for allocation of one or two antenna ports, the first Rank-4 pattern is a pattern for allocation of three or four antenna ports, and the Rank-8 pattern is a pattern for allocation of five, six, seven or eight antenna ports.

Preferably the determining unit 1002 is particularly configured to correspondingly determine twelve allocation schemes in total respectively including the Rank-2 pattern, the antenna port 0 and the scrambling identity 0; or the Rank-2 pattern, the antenna port 0 and the scrambling identity 1; or the Rank-2 pattern, the antenna port 1 and the scrambling identity 0; or the Rank-2 pattern, the antenna port 1 and the scrambling identity 1; or the Rank-2 pattern, the antenna port 0 and the antenna port 1, and the scrambling identity 0; or the Rank-2 pattern, the antenna port 0 and the antenna port 1, and the scrambling identity 1; or the first Rank-4 pattern, the antenna port 0, the antenna port 1 and the antenna port 2, and a default scrambling identity which is the scrambling identity 0 or the scrambling identity 1; or the first Rank-4 pattern, the antenna port 0, the antenna port 1, the antenna port 2 and the antenna port 3, and the default scrambling identity; or the Rank-8 pattern, the antenna port 0, the antenna port 1, the antenna port 2, the antenna port 3 and the antenna port 4, and the default scrambling identity; or the Rank-8 pattern, the antenna port 0, the antenna port 1, the antenna port 2, the antenna port 3, the antenna port 4 and the antenna port 5, and the default scrambling identity; or the Rank-8 pattern, the antenna port 0, the antenna port 1, the antenna port 2, the antenna port 3, the antenna port 4, the antenna port 5 and the antenna port 6, and the default scrambling identity; or the Rank-8 pattern, the antenna port 0, the antenna port 1, the antenna port 2, the antenna port 3, the antenna port 4, the antenna port 5, the antenna port 6 and the antenna port 7, and the default scrambling identity, allocated for the user equipment, according to at least twelve pieces of indication information represented by two scenarios represented by the TB indication information of the two TBs and eight pieces of control information represented by the 3-bit control information in combination, carried in the signal indication information.

Preferably the predetermined at most four patterns determined by the determining unit 1002 further includes the second Rank-4 pattern, where the second Rank-4 pattern is used for allocation of one or two antenna ports.

Preferably the TB indication information corresponding respectively to the two TBs followed by the determining unit 1002 further includes fourth TB indication information representing an unused first TB, the second TB indication information representing the used second TB and an NDI bit in the fourth TB indication information.

Preferably the determining unit 1002 is particularly further configured to correspondingly determine six allocation schemes in total respectively including the second Rank-4 pattern, the antenna port 0 and the default scrambling identity; or the second Rank-4 pattern, the antenna port 1 and the default scrambling identity; or the second Rank-4 pattern, the antenna port 2 and the default scrambling identity; or the second Rank-4 pattern, the antenna port 3 and the default scrambling identity; or the second Rank-4 pattern, the antenna port 0 and the antenna port 1, and the default scrambling identity; or the second Rank-4 pattern, the antenna port 2 and the antenna port 3, and the default scrambling identity, allocated for the user equipment, according to at least six pieces of indication information, other than the represented at least twelve pieces of indication information, represented by three scenarios represented by the TB indication information of the two TBs and the eight pieces of control information represented by the 3-bit control information in combination, carried in the signal indication information.

Preferably the predetermined at most four patterns determined by the determining unit 1002 include the Rank-2 pattern, the first Rank-4 pattern, the second Rank-4 pattern and the Rank-8 pattern, where the Rank-2 pattern is a pattern for allocation of one or two antenna ports, the first Rank-4 pattern is a pattern for allocation of three or four antenna ports, the second Rank-4 pattern is a pattern for allocation of one or two antenna ports, and the Rank-8 pattern is a pattern for allocation of five, six, seven or eight antenna ports.

Preferably the determining unit 1002 is particularly configured to correspondingly determine eighteen allocation schemes in total respectively including the Rank-2 pattern, the antenna port 0 and the scrambling identity 0; or the Rank-2 pattern, the antenna port 0 and the scrambling identity 1; or the Rank-2 pattern, the antenna port 1 and the scrambling identity 0; or the Rank-2 pattern, the antenna port 1 and the scrambling identity 1; or the Rank-2 pattern, the antenna port 0 and the antenna port 1, and the scrambling identity 0; or the Rank-2 pattern, the antenna port 0 and the antenna port 1, and the scrambling identity 1; or the second Rank-4 pattern, the antenna port 0 and a default scrambling identity which is the scrambling identity 0 or the scrambling identity 1; or the second Rank-4 pattern, the antenna port 1 and the default scrambling identity; or the second Rank-4 pattern, the antenna port 2 and the default scrambling identity; or the second Rank-4 pattern, the antenna port 3 and the default scrambling identity; or the second Rank-4 pattern, the antenna port 0 and the antenna port 1, and the default scrambling identity; or the second Rank-4 pattern, the antenna port 2 and the antenna port 3, and the default scrambling identity; or the first Rank-4 pattern, the antenna port 0, the antenna port 1 and the antenna port 2, and the default scrambling identity; or the first Rank-4 pattern, the antenna port 0, the antenna port 1, the antenna port 2 and the antenna port 3, and the default scrambling identity; or the Rank-8 pattern, the antenna port 0, the antenna port 1, the antenna port 2, the antenna port 3 and the antenna port 4, and the default scrambling identity; or the Rank-8 pattern, the antenna port 0, the antenna port 1, the antenna port 2, the antenna port 3, the antenna port 4 and the antenna port 5, and the default scrambling identity; or the Rank-8 pattern, the antenna port 0, the antenna port 1, the antenna port 2, the antenna port 3, the antenna port 4, the antenna port 5 and the antenna port 6, and the default scrambling identity; or the Rank-8 pattern, the antenna port 0, the antenna port 1, the antenna port 2, the antenna port 3, the antenna port 4, the antenna port 5, the antenna port 6 and the antenna port 7, and the default scrambling identity, allocated for the user equipment, according to at least eighteen pieces of indication information represented by two scenarios represented by the TB indication information of the two TBs and sixteen pieces of control information represented by the 4-bit control information in combination, carried in the signal indication information.

Figure 11:
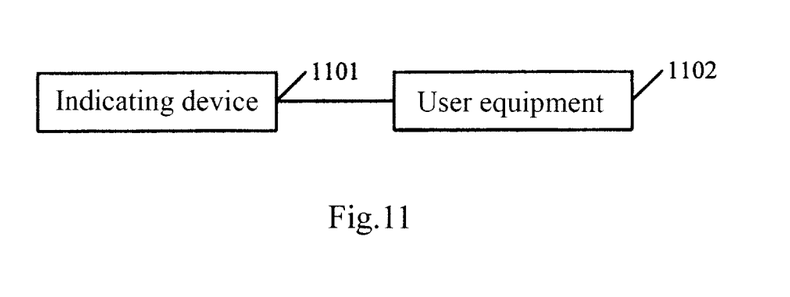
FIG. 11 is a schematic structural diagram of a system for indicating a user equipment-specific demodulation reference signal according to the fourth embodiment of the invention.

Correspondingly the fourth embodiment of the invention further provides a system for indicating a user equipment-specific demodulation reference signal with a structure as schematically illustrated in FIG. 11, and the system includes an indicating device 1101 and a user equipment 1102, where:

The indicating device 1101 is configured to generate signal indication information and to transmit the generated signal indication information to the user equipment 1102; and The user equipment 1102 is configured to determine information on a demodulation reference signal pattern, information on an antenna port and a scrambling identity of a reference signal sequence allocated for the user equipment according to TB indication information of TBs and control information of a plurality of bits carried in the received signal indication information.

In summary the solution according to the embodiments of the invention includes: generating, at the network side, signal indication information and transmitting the generated signal indication information to a user equipment; and the user equipment determining information on a demodulation reference signal pattern, information on an antenna port and a scrambling identity of a reference signal sequence allocated for the user equipment according to TB indication information of TBs and control information of a plurality of bits carried in the received signal indication information. With the solution according to the embodiments of the invention, an overhead of signaling for indicating a user equipment-specific demodulation reference signal is reduced and further wasted resources of a system are reduced as compared with the prior art.

Evidently those skilled in the art can make various modifications and variations to the invention without departing from the spirit and the scope of the invention. Thus the invention is also intended to encompass these modifications and variations thereto as long as these modifications and variations come into the scope of the claims appended to the invention and their equivalents.

The invention claimed is:

1. A method for indicating a user equipment-specific demodulation reference signal, comprising:
   generating signal indication information indicating information on a demodulation reference signal pattern, information on an antenna port and a scrambling identity of a reference signal sequence allocated for a user equipment based upon Transport Block (TB) indication information of TBs and control information of a plurality of bits; and
   transmitting the generated signal indication information to the user equipment, wherein the TB indication information of the TBs is TB indication information corresponding respectively to two TBs, and the control information of the plurality of bits is 3-bit or 4-bit control information, and indicating the information on the demodulation reference signal pattern, the information on the antenna port and the scrambling identity of the reference signal sequence allocated for the user equipment based upon the TB indication information of the TBs and the control information of the plurality of bits comprises:
   correspondingly indicate a total number N of allocation schemes respectively of the information on the demodulation reference signal pattern, the information on the antenna port and the scrambling identity of the reference signal sequence allocated for the user equipment based upon at least N pieces of indication information represented by the TB indication information of the TBs and the control information of the plurality of bits in combination,
   wherein the TB indication information corresponding respectively to the two TBs comprises first TB indication information representing a used first TB and second TB indication information representing a used second TB; or first TB indication information representing a used first TB and third TB indication information representing an unused second TB,
   wherein the demodulation reference signal pattern comprises the Rank-2 pattern, the first Rank-4 pattern and the Rank-8 pattern, wherein the Rank-2 pattern is a pattern for allocation of one or two antenna ports, the first Rank-4 pattern is a pattern for allocation of three or four antenna ports, and the Rank-8 pattern is a pattern for allocation of five, six, seven or eight antenna ports, and
   wherein indicating the information on the demodulation reference signal pattern, the information on the antenna port and the scrambling identity of the reference signal sequence allocated for the user equipment based upon the Transport Block (TB) indication information of the TBs and the control information of the plurality of bits comprises:

correspondingly indicating twelve allocation schemes in total respectively comprising the Rank-2 pattern, the antenna port 0 and the scrambling identity0; or the Rank-2 pattern, the antenna port 0 and the scrambling identity1; or the Rank-2 pattern, the antenna port 1 and the scrambling identity0; or the Rank-2 pattern, the antenna port 1 and the scrambling identity1; or the Rank-2 pattern, the antenna port 0 and the antenna port 1, and the scrambling identity0; or the Rank-2 pattern, the antenna port 0 and the antenna port 1, and the scrambling identity1; or the first Rank-4 pattern, the antenna port 0, the antenna port 1 and the antenna port 2, and a default scrambling identity which is the scrambling identity0 or the scrambling identity1; or the first Rank-4 pattern, the antenna port 0, the antenna port 1, the antenna port 2 and the antenna port 3, and the default scrambling identity; or the Rank-8 pattern, the antenna port 0, the antenna port 1, the antenna port 2, the antenna port 3 and the antenna port 4, and the default scrambling identity; or the Rank-8 pattern, the antenna port 0, the antenna port 1, the antenna port 2, the antenna port 3, the antenna port 4 and the antenna port 5, and the default scrambling identity; or the Rank-8 pattern, the antenna port 0, the antenna port 1, the antenna port 2, the antenna port 3, the antenna port 4, the antenna port 5 and the antenna port 6, and the default scrambling identity; or the Rank-8 pattern, the antenna port 0, the antenna port 1, the antenna port 2, the antenna port 3, the antenna port 4, the antenna port 5, the antenna port 6 and the antenna port 7, and the default scrambling identity, allocated for the user equipment, according to at least twelve pieces of indication information represented by two scenarios represented by the TB indication information of the two TBs and eight pieces of control information represented by the 3-bit control information in combination.

2. The method according to claim 1, wherein the demodulation reference signal pattern further comprises the second Rank-4 pattern, wherein the second Rank-4 pattern is a pattern for allocation of one or two antenna ports.

3. The method according to claim 2, wherein the TB indication information corresponding respectively to the two TBs alternatively comprises first TB indication information representing a used first TB, third TB indication information representing an unused second TB and an NDI bit in the third TB indication information.

4. The method according to claim 3, wherein indicating the information on the demodulation reference signal pattern, the information on the antenna port and the scrambling identity of the reference signal sequence allocated for the user equipment based upon the Transport Block (TB) indication information of the TBs and the control information of the plurality of bits comprises:

correspondingly indicating six allocation schemes in total respectively comprising the second Rank-4 pattern, the antenna port 0 and the default scrambling identity; or the second Rank-4 pattern, the antenna port 1 and the default scrambling identity; or the second Rank-4 pattern, the antenna port 2 and the default scrambling identity; or the second Rank-4 pattern, the antenna port 3 and the default scrambling identity; or the second Rank-4 pattern, the antenna port 0 and the antenna port 1, and the default scrambling identity; or the second Rank-4 pattern, the antenna port 2 and the antenna port 3, and the default scrambling identity, allocated for the user equipment, according to at least six pieces of indication information represented, other than the twelve pieces of indication information represented by three scenarios represented by the TB indication information of the two TBs and the eight pieces of control information represented by the 3-bit control information in combination.

5. A user equipment, comprising:

a receiving unit configured to receive signal indication information; and a determining unit configured to determine information on a demodulation reference signal pattern, information on an antenna port and a scrambling identity of a reference signal sequence allocated for the user equipment according to Transport Block (TB) indication information of TBs and control information of a plurality of bits carried in the signal indication information, wherein the determining unit is further configured to correspondingly determine a total number N of allocation schemes respectively of the information on the demodulation reference signal pattern, the information on the antenna port and the scrambling identity of the reference signal sequence allocated for the user equipment according to at least N pieces of indication information represented by the TB indication information of the TBs and the control information of the plurality of bits in combination, carried in the signal indication information, wherein the TB indication information of the TBs is TB indication information corresponding respectively to two TBs, and the control information of the plurality of bits is 3-bit or 4-bit control information; and the information on the demodulation reference signal pattern is information on one of predetermined at most four patterns, and the scrambling identity of the reference signal sequence is one of scrambling identities corresponding respectively to two predetermined reference signal sequences, wherein the TB indication information corresponding respectively to the two TBs followed by the determining unit comprises first TB indication information representing a used first TB and second TB indication information representing a used second TB; or first TB indication information representing a used first TB and third TB indication information representing an unused second TB, and wherein the predetermined at most four patterns determined by the determining unit comprise the Rank-2 pattern, the first Rank-4 pattern and the Rank-8 pattern, wherein the Rank-2 pattern is a pattern for allocation of one or two antenna ports, the first Rank-4 pattern is a pattern for allocation of three or four antenna ports, and the Rank-8 pattern is a pattern for allocation of five, six, seven or eight antenna ports, wherein the determining unit is further configured to correspondingly determine twelve allocation schemes in total respectively comprising the Rank-2 pattern, the antenna port 0 and the scrambling identity0; or the Rank-2 pattern, the antenna port 0 and the scrambling identity1; or the Rank-2 pattern, the antenna port 1 and the scrambling identity0; or the Rank-2 pattern, the antenna port 1 and the scrambling identity1; or the Rank-2 pattern, the antenna port 0 and the antenna port 1, and the scrambling identity0; or the Rank-2 pattern, the antenna port 0 and the antenna port 1, and the scrambling identity1; or the first Rank-4 pattern, the antenna port 0, the antenna port 1 and the antenna port 2, and a default scrambling identity which is the scrambling identity0 or the scrambling identity1; or the first Rank-4 pattern, the antenna port 0, the antenna port 1, the antenna port 2 and the antenna port 3, and the default scrambling identity; or the Rank-8 pattern, the antenna port 0, the antenna port 1, the antenna port 2, the antenna port 3 and the antenna port 4, and the default scrambling identity; or the Rank-8 pattern, the antenna port 0, the antenna port 1, the antenna port 2, the antenna port 3, the antenna port 4 and the antenna port 5, and the default scrambling identity; or the Rank-8 pattern, the antenna port 0, the antenna port 1, the antenna port 2, the antenna port 3, the antenna port 4, the antenna port 5 and the antenna port 6, and the default scrambling identity; or the Rank-8 pattern, the antenna port 0, the antenna port 1, the antenna port 2, the antenna port 3, the antenna port 4, the antenna port 5, the antenna port 6 and the antenna port 7, and the default scrambling identity, allocated for the user equipment, according to at least twelve pieces of indication information represented by two scenarios represented by the TB indication information of the two TBs and eight pieces of control information represented by the 3-bit control information in combination, carried in the signal indication information.

6. The user equipment according to claim 5, wherein the predetermined at most four patterns determined by the determining unit further comprises the second Rank-4 pattern, wherein the second Rank-4 pattern is used for allocation of one or two antenna ports, and the TB indication information corresponding respectively to the two TBs followed by the determining unit alternatively comprises first TB indication information representing a used first TB, third TB indication information representing an unused second TB and an NDI bit in the third TB indication information.

7. The user equipment according to claim 6, wherein the determining unit is further configured to correspondingly determine six allocation schemes in total respectively comprising the second Rank-4 pattern, the antenna port 0 and the default scrambling identity; or the second Rank-4 pattern, the antenna port 1 and the default scrambling identity; or the second Rank-4 pattern, the antenna port 2 and the default scrambling identity; or the second Rank-4 pattern, the antenna port 3 and the default scrambling identity; or the second Rank-4 pattern, the antenna port 0 and the antenna port 1, and the default scrambling identity; or the second Rank-4 pattern, the antenna port 2 and the antenna port 3, and the default scrambling identity, allocated for the user equipment, according to at least six pieces of indication information represented, other than the twelve pieces of indication information, represented by three scenarios represented by the TB indication information of the two TBs and the eight pieces of control information represented by the 3-bit control information in combination, carried in the signal indication information.

8. A system for indicating a user equipment-specific demodulation reference signal, comprising an indicating device and a user equipment, wherein:

the indicating device is configured to generate signal indication information and to transmit the generated signal indication information to the user equipment; and the user equipment is configured to determine information on a demodulation reference signal pattern, information on an antenna port and a scrambling identity of a reference signal sequence allocated for the user equipment according to Transport Block (TB) indication information of TBs and control information of a plurality of bits carried in the received signal indication information, wherein the user equipment comprises:

a receiving unit configured to receive signal indication information; and a determining unit configured to determine information on a demodulation reference signal pattern, information on an antenna port and a scrambling identity of a reference signal sequence allocated for the user equipment according to Transport Block (TB) indication information of TBs and control information of a plurality of bits carried in the signal indication information, wherein the determining unit is further configured to correspondingly determine a total number N of allocation schemes respectively of the information on the demodulation reference signal pattern, the information on the antenna port and the scrambling identity of the reference signal sequence allocated for the user equipment according to at least N pieces of indication information represented by the TB indication information of the TBs and the control information of the plurality of bits in combination, carried in the signal indication information, wherein the TB indication information of the TBs is TB indication information corresponding respectively to two TBs, and the control information of the plurality of bits is 3-bit or 4-bit control information; and the information on the demodulation reference signal pattern is information on one of predetermined at most four patterns, and the scrambling identity of the reference signal sequence is one of scrambling identities corresponding respectively to two predetermined reference signal sequences, wherein the TB indication information corresponding respectively to the two TBs followed by the determining unit comprises first TB indication information representing a used first TB and second TB indication information representing a used second TB; or first TB indication information representing a used first TB and third TB indication information representing an unused second TB, and the predetermined at most four patterns determined by the determining unit comprise the Rank-2 pattern, the first Rank-4 pattern and the Rank-8 pattern, wherein the Rank-2 pattern is a pattern for allocation of one or two antenna ports, the first Rank-4 pattern is a pattern for allocation of three or four antenna ports, and the Rank-8 pattern is a pattern for allocation of five, six, seven or eight antenna ports, wherein the determining unit is further configured to correspondingly determine twelve allocation schemes in total respectively comprising the Rank-2 pattern, the antenna port 0 and the scrambling identity0; or the Rank-2 pattern, the antenna port 0 and the scrambling identity1; or the Rank-2 pattern, the antenna port 1 and the scrambling identity0; or the Rank-2 pattern, the antenna port 1 and the scrambling identity1; or the Rank-2 pattern, the antenna port 0 and the antenna port 1, and the scrambling identity0; or the Rank-2 pattern, the antenna port 0 and the antenna port 1, and the scrambling identity1; or the first Rank-4 pattern, the antenna port 0, the antenna port 1 and the antenna port 2, and a default scrambling identity which is the scrambling identity0; or the scrambling identity1; or the first Rank-4 pattern, the antenna port 0, the antenna port 1, the antenna port 2 and the antenna port 3, and the default scrambling identity; or the Rank-8 pattern, the antenna port 0, the antenna port 1, the antenna port 2, the antenna port 3 and the antenna port 4, and the default scrambling identity; or the Rank-8 pattern, the antenna port 0, the antenna port 1, the antenna port 2, the antenna port 3, the antenna port 4 and the antenna port 5, and the default scrambling identity; or the Rank-8 pattern, the antenna port 0, the antenna port 1, the antenna port 2, the antenna port 3, the antenna port 4, the antenna port 5 and the antenna port 6, and the default scrambling identity; or the Rank-8 pattern, the antenna port 0, the antenna port 1, the antenna port 2, the antenna port 3, the antenna port 4, the antenna port 5, the antenna port 6 and the antenna port 7, and the default scrambling identity, allocated for the user equipment, according to at least twelve pieces of indication information represented by two scenarios represented by the TB indication information of the two TBs and eight pieces of control information represented by the 3-bit control information in combination, carried in the signal indication information.

\* \* \* \* \*